Patented Aug. 19, 1952

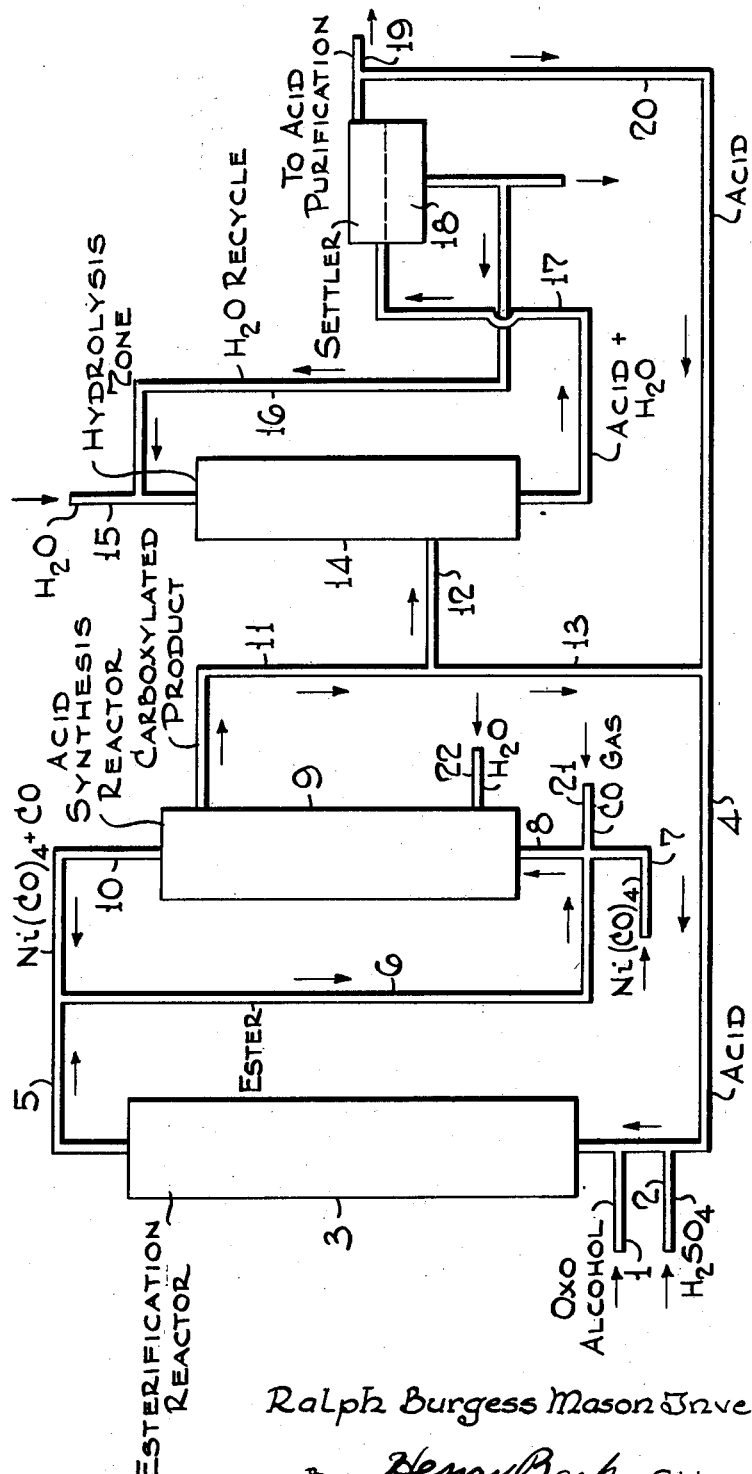

2,607,787

UNITED STATES PATENT OFFICE 2,607,787

PREPARATION OF CARBOXYLIC ACIDS FROM OXO ALCOHOL ESTERS

Ralph Burgess Mason, Baton Rouge, La., assignor to Standard Oil Development Company, a corporation of Delaware Application August 1, 1950, Serial No. 176,975

6 Claims. (Cl. 260—413)

This invention relates generally to a method for the synthesis of fatty acids from olefins and specifically to an improved method for fatty acid synthesis in which the reactions are carried out in a stepwise fashion, whereby more efficient conversion of the olefin to fatty acid is accomplished.

An improved method has been discovered for the synthesis of fatty acids from olefins which comprises conducting the over-all synthesis reaction in stages. Thus, the desired olefin or its Oxo alcohol derivative is reacted with previously formed fatty acid to produce an ester. The esters are then reacted with carbon monoxide to give a carboxylated product including the acid anhydride. The carboxylated product is then subjected to hydrolysis to yield two molecules of fatty acid. A part of the fatty acid is preferably recycled to the first stage for again forming the esters which on carboxylation tend to form symmetrical acid anhydrides.

It has been known that fatty acids can be prepared from straight-chain olefinic hydrocarbons by reaction of these unsaturated hydrocarbons with carbon monoxide and steam. The synthesis of aliphatic acids in this fashion is commonly carried out by a one-step process in the presence of a catalyst. Catalysts which have been variously proposed for the acid synthesis include various metals and metal carbonyls, as well as acidic catalysts such as halogen derivatives of boron, for instance, boron fluoride. The reaction may be represented by the following generalized equation in which R may be hydrogen, alkyl, aryl or aralkyl:

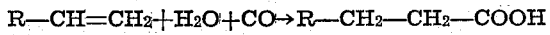

It has been found experimentally, however, that certain olefins, principally branched $C_8$–$C_{16}$ olefins, do not react appreciably with CO and $H_2$ in the presence of metal carbonyl catalysts. Thus, the branched chain olefinic polymers have to be treated in a different manner, as will be described in more detail, to obtain fatty acids therefrom in using the carboxylation reaction. This is especially true when metal carbonyl catalysts are to be employed. Copper and nickel salts have been found to be especially effective as promoters.

The inherent unreactive nature of the higher molecular weight branched chain olefins as the polymerized ethylene, propylene, and butylene fractions can be overcome, and very much improved yields of organic acids can be obtained using olefin streams by carrying out the synthesis reaction in stages. The effect is especially noteworthy in the treatment of $C_8$ to $C_{16}$ branched chain olefins. In these cases, the yields of acids from the olefin feeds are very much improved. In brief, the stages can be referred to as esterification, carboxylation, and hydrolysis. The general mechanism of the ultimate acid formation can be formulated according to the following set of equations:

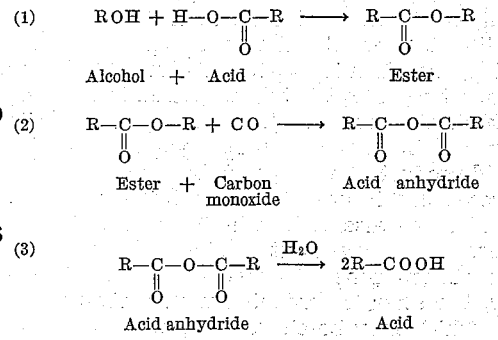

The feed used in this stepwise process may be either the olefin itself or it may be an alcohol obtained from the olefin by an Oxo type synthesis reaction. The alcohol used should contain one less carbon atom than the acid being produced, and, in turn, the olefin used should have one less carbon atom than the alcohol in order to avoid production of mixtures of acids. In the Oxo synthesis, the olefin is first subjected to an oxonation with carbon monoxide and hydrogen to produce an Oxo aldehyde product which is subsequently converted to the corresponding Oxo alcohol by catalytic hydrogenation. It is preferred to employ the Oxo alcohol as the starting material, since in this way the final acid product has one more carbon atom than does the acid product made from the olefin feed directly. The alternate choice of feed serves to make the over-all process a flexible one. Furthermore, the ease and convenience of using an Oxo alcohol as feed to produce fatty acids is quite advantageous in that the two synthetic processes can be operated in conjunction with each other. In any event, the olefin feeds which can be especially utilized in this invention include branched chain olefins of the $C_8$-$C_{16}$ range and Oxo alcohols derived therefrom, giving fatty acids of branched chain structure and having from nine to eighteen carbon atoms. In any case, to avoid contaminating by-products, the olefins used should be as pure as possible. The products obtained include higher molecular weight, branched chain fatty acids which, in the past, have proved to be hardest to prepare by ordinary methods for making acids.

The initial stage of the process is an esterification. This esterification can be either the reaction of an olefin or of an alcohol with an acid. The acid employed is preferably that being produced in the synthesis in order to avoid mixed esters which would result in undesirable mixtures of acids. If an olefin is used, it is best to employ as the catalyst some such agent as boron fluoride, while, if the Oxo alcohol prepared from the olefin is used, a more conventional esterification catalyst as, for instance, sulfuric acid, sulfonic acids, phosphoric acid, hydrogen chloride, as well as boron halides may be used. In the case that the olefin is used rather than the alcohol, it may be more desirable to use some recycled carboxylated product rather than recycled acid as the esterification agent, since the carboxylated product is generally more reactive than the acids.

Conditions for the liquid phase esterifications are, generally, temperatures of 150°–300° F., and pressures ranging from atmospheric to 10 atmospheres. The catalyst may be used in a small amount in comparison to the amount of the total charge. Ten percent of catalyst by weight is usually sufficient to give a satisfactory reaction velocity. The esterification should be continued until the reaction is essentially complete.

The ester product is thence passed to the acid synthesis reactor to undergo carboxylation. In order to achieve the maximum yield and purity of acid product, the ester may be separated from the reaction mixture. However, this is not considered to be essential. The $BF_3$ catalyst need not even be removed but can be passed into the carboxylation zone. In the acid synthesis reactor, the ester is contacted with carbon monoxide which may be either pure or may be admixed with gases such as nitrogen and hydrogen. The catalyst used for carrying out the liquid phase carboxylation reaction may be metals, fatty acid salts, or other metallic salts, but it is preferably selected from the group of metallic carbonyls. Two of the more desirable carbonyls for use in the reaction are nickel and cobalt carbonyls. These catalysts may be additionally promoted with metallic salts such as these: nickel acetate, nickel propionate, copper iodide, and copper salts of organic acids, both of the aromatic and aliphatic classes. Some catalysts, such as $BF_3$, when used in the esterification stage, can also be employed to advantage in the carboxylation stage.

The conditions used in the carboxylation will vary somewhat with the type of catalyst used. With acidic type catalysts, temperatures of 100°–400° F. are employed at pressures in the range of 200 to 6000 p. s. i. g. With metals, metallic salts, or metallic carbonyls, temperatures in the range of 200°–700° F. and pressures in the range of 1000 to 6000 p. s. i. g. are employed. The carboxylation reaction should be carried out under optimum conditions for maximum conversion of the ester to the carboxylated product including anhydride. Although some water is desirable in this stage, in the event that too great a quantity of water is present in the carboxylation stage, the fatty acids will be produced directly rather than the anhydride. Thus, it is possible to carry out the carboxylation and the hydrolysis of the carboxylated product in one step. For large scale operations, it is most desirable to operate using two stages, thus carrying out the hydrolysis in a separate step.

The carboxylated product consisting, at least partially, of anhydride, is then subjected to hydrolysis with water at an elevated temperature. The hydrolysis may, if desired, be carried out under pressure. Essentially, this stage is a contacting zone in which the carboxylated product is hydrolyzed to the free fatty acid. The hydrolyzed mixture is passed to a settler. Since, in general, the process is best used for production of higher molecular weight fatty acids, these acids will be water-insoluble. Two layers are obtained upon settling the hydrolyzed mixture. The upper acid layer is removed as product. A part is, of course, recycled to the esterification zone while the remainder may be further subjected to any type of purification desired. The lower water layer is recycled to the hydrolysis zone. It is not necessary to purify the anhydride from the total carboxylated product, prior to its hydrolysis.

The entire process is carried out on a continuous scale, advantage being taken of the fact that smaller amounts of each particular catalyst are effective in conjunction with the favorable effects offered of employing different catalysts in the different stages. Furthermore, it is not even necessary to remove one catalyst from the product upon passing the intermediate product into the next stage. Thus, boron fluoride may be employed in the esterification stage and nickel carbonyl in the carboxylation stage without removal of boron fluoride from the ester product.

Table I shows comparative data in which a $C_{12}$-$C_{13}$ polypropylene olefin of boiling range 350°–430° F. is employed as the starting olefinic feed stock. The olefin here used is of the branched chain type which is difficult to convert to fatty acid by the ordinary carboxylation reaction. Thus, run I using the preferred nickel carbonyl catalyst gave only 1% yield. After a treatment with ferrous sulfate which was expected to remove any natural inhibitors present, the yield of acid from the synthesis was not improved.

Following this improved method for carrying the reaction out in stages as shown in run III, a good yield of acid was obtained, considering the high molecular weight of the olefin used. The $C_{12}$-$C_{13}$ polymer olefin was initially subjected to an oxonation and hydrogenation to form the alcohol. This Oxo alcohol was then esterified with a $C_{15}$ acid, obtained by the carboxylation synthesis reaction, using a small amount of sulfuric acid as esterification catalyst. The unpurified ester product was then subjected to carboxylation with CO and a nickel carbonyl catalyst. Saponification of the product indicated an acid yield of about 13%.

TABLE I

*Comparative runs on same olefinic feed, $C_{12}$–$C_{13}$ polypropylene (B. P. 350°–430° F.)*

| Run No. | I | II | III | | |
|---|---|---|---|---|---|
| Treatment | Carboxylation | Mild FeSO₄ Treat and Carboxylation | Oxonation + Hydrogenation (Oxo Reaction) | Esterification | Carboxylation |
| Catalyst | (¹) | (¹) | Co Oleate | H₂SO₄ | Nickel Carbonyl |
| Moles Ni | 0.1 | 0.1 | | | 0.2 |
| Moles Ni Acetate Promoter | 0.3 | 0.2 | | | 0.3 |
| Mole Ratio Feed/Water/Catalyst | 1/3.8/0.08 | 1/3.8/0.08 | | | 1/1.35/0.3 |
| Added Gas | CO | | | | |
| Pressure, p. s. i. g | 4,400 | 3,400 | 3,000 | Atm. | 4,000 |
| Temperature, °F | 500 | 550 | 350 | ca 200 | 550 |
| Hours of Run | 12 | 12 | 5 | | 4 |
| Product: | | | | | |
| Acid No | 4 | 3 | 0.5 | 6 | |
| Saponification No | 7 | 7 | 5 | 75 | |
| Hydroxyl No | | | 158 | 2 | |
| Bromine No | 131 | 120 | 7 | 5 | |
| Fatty Acid Yield Weight Percent Based on Olefin | 1 | 1 | | | 13 |

¹ Promoted nickel carbonyl.

The yields obtained in run III in which the reaction was carried out in stages are significantly above those obtained in a single stage operation where little or no yield was obtained. Further, it is of note that in run III, no purification or separation of products was employed between the various stages. Nevertheless, substantial yields of the final acid were obtained.

The over-all process will be readily understood by the following description of a specific embodiment which should be read in conjunction with the accompanying diagrammatic outline of the various stages of the process.

An Oxo alcohol, such as is prepared from a $C_{12}$–$C_{13}$ polypropylene olefinic fraction is passed by line 1 into a closed esterification reactor 3. A catalytic amount (about 2 to 10 wt. per cent) of sulfuric acid is added to reactor 3 via line 2. In reactor 3, the alcohol is contacted with either recycled fatty acid produced during the operation or a part of the anhydride intermediate can be employed as a source of acid for the esterification. Esterification reactor 3 is suitably supplied with heating means to maintain temperatures of about 200° F. Essentially atmospheric pressures are employed for the liquid phase esterification. The acid and alcohol should be contacted for a time sufficient to accomplish substantially complete esterification.

The total reaction products, including the ester and the unused catalyst, are passed by lines 5 and 6 into acid synthesis reactor 9. The feed to this reactor includes about 5 to 15 wt. per cent Ni(CO)₄ added by lines 7 and 8 as catalyst and an appropriate amount of water added by line 22. The reactor may desirably be constructed with a copper lining or a small amount of a copper or nickel salt may be added since copper and nickel serve to act as promoters for the carboxylation. The ratio of initial olefin employed to water to catalyst preferred is about 1/1.35/0.3. A sufficient amount of carbon monoxide gas (about 95% purity) is added continuously by lines 21 and 8 to reactor 9 to maintain a pressure of about 4000 p. s. i. g. Temperatures of around 550° F. are employed for the carboxylation. After a greater part of the ester is carboxylated to give products including anhydride, the total carboxylated products are passed by lines 11 and 12 to hydrolysis zone 14. The gases, including Ni(CO)₄ and excess CO, are recycled by lines 10 and 6 back to acid synthesis reactor 9. At least a part of the carboxylated product may be recycled directly back to esterification reactor. The recycle of a part of the anhydride product is of especial usefulness when a part of the initial esterification feed is olefinic.

The carboxylated product, passed by line 12 to hydrolysis zone 14, is contacted with water introduced into zone 14 by line 15. The hydrolysis zone 14 is operated at about atmospheric pressure. The zone should be equipped for suitable heating at temperatures of 400°–500° F. The exact temperature employed in hydrolysis zone 14 will depend upon residence time of the carboxylated product within the reactor. The hydrolyzed acid and water mixture is passed by means of line 17 into settler 18 where the insoluble fatty acids form an upper layer and the water, together with small amounts of dissolved impurities such as acid and soluble organic products, forms a lower layer. This lower, aqueous layer is largely recycled through lines 16 and 15 back to hydrolysis zone 14. The upper, fatty acid layer is removed by line 19 to such acid purification steps as are desirable. At least a substantial portion of the acid is recycled through line 20 back to esterification reactor 3 to esterify additional alcohol and continue the process.

What is claimed is:

1. A method for preparing higher molecular weight, aliphatic carboxylic acids of the branched chain type, which comprises subjecting a mixture of Oxo alcohols derived from an olefin stream consisting predominantly of branched chain olefins of the $C_8$–$C_{16}$ range to an esterification with higher molecular weight aliphatic carboxylic acids in the presence of an esterification catalyst, whereby there is produced a mixture consisting predominantly of organic esters, subjecting said mixture of organic esters to a carboxylation reaction with carbon monoxide in the presence of a carboxylation catalyst, thereafter subjecting the carboxylated organic product so produced to hydrolysis, and recovering higher molecular weight, aliphatic carboxylic acids of the branched chain type from the hydrolyzed mixture.

2. A method for the preparation of branched chain fatty acids which comprises reacting a mixture of Oxo alcohols derived from an olefin stream consisting predominantly of branched chain olefins of the $C_8$–$C_{16}$ range with a part of the previously formed fatty acids in the presence of an acidic esterification catalyst at a temperature in the range of 150°–300° F., whereby there is produced a mixture of organic esters, passing the resulting mixture of organic esters to a carboxylation zone, carboxylating said mixture of organic esters with carbon monoxide in the presence of a metallic carbonyl carboxylation catalyst at temperatures in the range of 200°–700° F. and at superatmospheric pressures in the range of 1,000 to 6,000 p. s. i. g., whereby the organic esters are substantially carboxylated to give a mixture containing organic acid anhydrides, hydrolyzing the said carboxylated product to a mixture of fatty acids, and recovering at least a part of said fatty acids from the hydrolyzed mixture.

3. A process according to claim 2 in which the esterification catalyst is a small amount of sulfuric acid and the carboxylation catalyst is nickel carbonyl.

4. A process according to claim 2 in which the esterification catalyst is boron trifluoride and the carboxylation catalyst is nickel carbonyl.

5. A method for the preparation of $C_{14}$–$C_{15}$ fatty acids which comprises reacting a mixture of Oxo alcohols derived by the Oxo process from a $C_{12}$–$C_{13}$ polypropylene olefin stream with a part of the previously formed $C_{14}$–$C_{15}$ fatty acids in the presence of a catalytic amount of sulfuric acid at a temperature of about 200° F. to produce an esterified organic product, thereafter contacting said esterified organic product with carbon monoxide in the presence of a nickel carbonyl catalyst and water at a temperature of about 550° F. and a pressure of about 4,000 p. s. i. g. to produce a carboxylated organic product containing acid anhydrides, hydrolizing the carboxylated product to a mixture of fatty acids, contacting a part of said fatty acids so produced with fresh Oxo alcohol to produce an additional esterified product, and recovering the remaining part of the resulting $C_{14}$–$C_{15}$ fatty acids.

6. A method for the preparation of a higher molecular weight aliphatic carboxylic acid of the branched chain type which comprises subjecting an Oxo alcohol derived from an olefin stream consisting predominantly of a branched chain olefin having from 8 to 16 carbon atoms, to an esterification with a higher molecular weight aliphatic carboxylic acid having one more carbon atom than the Oxo alcohol in the presence of an esterification catalyst, whereby there is produced an organic ester, subjecting said organic ester to a carboxylation reaction with carbon monoxide in the presence of a carboxylation catalyst, subjecting the resulting carboxylated organic product so produced to hydrolysis, and recovering a higher molecular weight aliphatic carboxylic acid of the branched chain type having one more carbon atom than the Oxo alcohol from the hydrolyzed mixture.

RALPH BURGESS MASON.

REFERENCES CITED

The following references are of record in the file of this patent:

UNITED STATES PATENTS

| Number | Name | Date |
|---|---|---|
| 2,479,082 | Roland et al. | Aug. 16, 1949 |
| 2,497,304 | Gresham et al. | Feb. 14, 1950 |